3,573,290
SUBSTITUTED CINNAMIC ACIDS
Alfred Sallmann, Bottmingen, Basel-Land, and Rudolf Pfister, Basel, Switzerland, assignors to Geigy Chemical Corporation, Ardsley, N.Y.
No Drawing. Filed Oct. 4, 1967, Ser. No. 672,707
Claims priority, application Switzerland, Oct. 7, 1966, 14,523/66
Int. Cl. C07c 101/46
U.S. Cl. 260—240          6 Claims

ABSTRACT OF THE DISCLOSURE

Substituted o-anilino-cinnamic acids and addition salts thereof with bases, which compounds exhibit useful antiphlogistic, analgesic and antipyretic activity, and also possess UV absorbing properties, and processes for the production of these compounds; therapeutic as well as sun tan compositions containing these substituted cinnamic acids or a pharmaceutically acceptable addition salt thereof with a base and methods of treatment, particularly methods of inducing antiphlogistic, analgesic and antipyretic effects in mammals. An illustrative embodiment is o-(2,6-dichloroanilino)-cinnamic acid.

---

The invention relates to substituted cinnamic acids having valuable pharmacological as well as ultraviolet radiation absorbing properties. More particularly the invention pertains to substituted o-anilino-cinnamic acids and to addition salts thereof with inorganic or organic bases. The invention is further concerned with processes for the production of these acids and these addition salts. It is also an object of the invention to provide therapeutic compositions consisting essentially of (1) a substituted cinnamic acid according to the invention, or a pharmaceutically acceptable addition salt thereof with an inorganic or organic base, and (2) a pharmaceutical carrier. Another object of the invention is to provide sun tan compositions consisting essentially of (1) a substituted cinnamic acid according to the invention, or a pharmaceutically acceptable addition salt thereof with an inorganic or organic base, and (2) a carrier compatible with said compound and being of creamy to highly fluid consistency. Still another object of the invention is to provide methods of treatment involving the administration to a mammal requiring such treatment of a pharmacologically effective amount of a substituted cinnamic acid according to the invention or a pharmaceutically acceptable addition salt thereof with an inorganic or organic base; the methods of treatment according to this invention comprise particularly a method of producing an antiphlogistic effect, a method of producing an analgesic effect as well as a method of producing an antipyretic effect.

Substituted cinnamic acids of the general Formula I

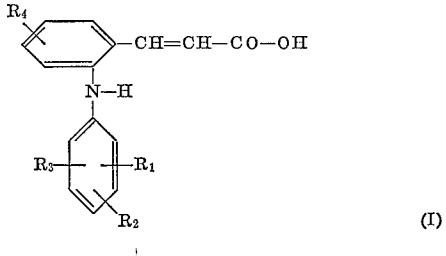

wherein each of $R_1$ and $R_2$ represents hydrogen, lower alkyl or alkoxy, halogen up to the atomic number 35 or trifluoromethyl, $R_3$ represents hydrogen, lower alkyl or alkoxy, or halogen up to the atomic number 35, and $R_4$ represents hydrogen, lower alkyl or alkoxy, halogen up to the atomic number 35, or trifluoromethyl, and their addition salts with inorganic or organic bases have not been known up to now.

In the acids of general Formula I and the starting materials used therefor which are mentioned below, as lower alkyl groups, $R_1$ to $R_4$ independently of each other are, e.g. methyl or ethyl groups. Some of the symbols mentioned can also be, e.g. n-propyl, isopropyl, n-butyl, sec. butyl or tert. butyl groups. Lower alkoxy groups or halogen atoms $R_1$ to $R_4$ are, e.g. methoxy, ethoxy, n-propoxy, n-butoxy or isobutoxy groups or chlorine, fluorine or bromine atoms respectively.

To produce the new substituted cinnamic acids of the general Formula I and their salts, an aldehyde of general Formula II

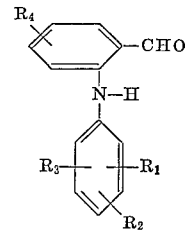

(II)

wherein $R_1$, $R_2$, $R_3$ and $R_4$ have the meanings given in Formula I, is condensed with acetanhydride or malonic acid by the Perkin or Knoevenagel or Doebner-Miller methods and, if desired, the acid obtained of general Formula I is converted into a salt with an inorganic or organic base. In particular, the aldehyde of general Formula II is condensed with acetanhydride in the presence of a condensing agent, or it is condensed with malonic acid in the presence of ammonia, a primary or secondary amine and/or its salts, or in the presence of a pyridine base and a slight amount of piperidine, and when acetanhydride is used, the acetyl radical which has formed at the nitrogen atom is split off by hydrolysis.

The condensation with acetanhydride in the presence of a condensing agent, particularly sodium or potassium acetate, potassium carbonate or a tertiary organic base such as triethylamine or pyridine, is preferably performed at the boiling temperature of the reaction mixture, any acetic acid being formed being distilled off. When the condensation is performed with malonic acid according to Knoevenagel, piperidine, piperidine acetate, diethylamine, methylamine hydrochloride or ammonia, for example, serve as condensing agents and a low alkanol such as ethanol serves as reaction medium. The condensation is performed, e.g. at 80–120°, if necessary in a closed vessel. The condensation according to Doebner-Miller is performed, e.g. at 70° to boiling temperature of the pyridine base such as pyridine or α-picoline.

According to a modification of the above process, the condensation with malonic acid is performed under milder conditions, the substituted benzylidene malonic acid first formed is separated and decarboxylated by heating.

Several processes can be used for the production of the aldehydes of general Formula II which are necessary as starting materials. Starting from N-phenyl anthranilic acid and N-phenyl anthranilic acids substituted corresponding to the definition of $R_1$–$R_4$, aldehydes of the general Formula II can be obtained by different processes which are usual for the conversion of carboxylic acids into aldehydes. For example, the carboxylic acids mentioned are converted by way of their methyl esters into their hydrazides and the latter are acylated with p-toluene sulphonyl chloride in pyridine. On heating the N'-(p-tolylsulphonyl)-hydrazides obtained with sodium carbonate in ethylene glycol to about 150–200°, the desired aldehydes are formed. These are also obtained from the corresponding carboxylic acids when the latter are converted into their chlorides and the chlorides are reacted with lithium-tri-tert. butoxy aluminum hydride (lithium hydrotri-tert.butoxy-aluminate) in an ether-type solvent such as diethylene glycol dimethyl ether, the reaction being performed without heating. Further, the aldehydes of general Formula II can also be obtained by oxidation of the corresponding alcohols, i.e. of o-anilino-benzyl alcohol and o-anilino-benzyl alcohols substituted as defined. The oxidation can be performed, e.g. with dimethyl sulphoxide in acetanhydride or with manganese dioxide, e.g. in acetone.

The new substituted cinnamic acids of general Formula I are produced by a second process by hydrolysing an ester or a nitrile of the general Formula III or IV respectively.

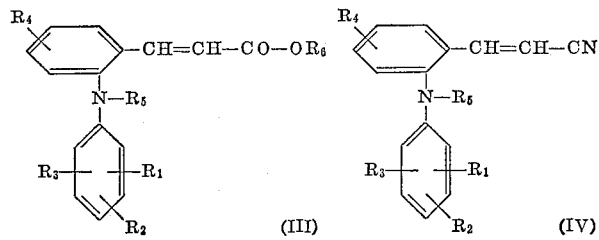

wherein $R_6$ represents a hydrocarbon radical having at most 10 carbon atoms and $R_5$ represents hydrogen or an acyl group, in particular a low alkanol group, and $R_1$, $R_2$, $R_3$ and $R_4$ have the meanings given in Formula I. Compounds of the general Formula III are hydrolysed, e.g. by means of at least the equimolar amount or, when there is an acyl group present as $R_5$, by means of at least double the molar amount of an alkali metal hydroxide or alkali metal bicarbonate—or by means of the equivalent amounts of alkali metal carbonates or alkaline earth metal hydroxides—e.g. in an aqueous low alkanol such as methanol, ethanol, n-butanol, also for example, in ethylene glycol or dimethyl formamide. The hydrolysis is performed at temperatures slightly above room temperature up to the boiling temperature of the solvents mentioned. In addition, the hydrolysis can also be performed with the aid of basic ion exchangers under otherwise reaction conditions corresponding to those given above. The hydrolysis of nitriles of general Formula IV is performed, e.g. by means of aqueous-alkanolic mineral acids, particularly aqueous-methanolic or aqueous-ethanolic hydrochloric acid, at room temperature up to boiling temperature of the reaction mixture. However, it can also be performed analogously to the method given above for the esters of general Formula III.

The esters of general Formula III serving as starting materials are themselves new compounds. They can be produced e.g. by reacting aldehydes of the general Formula II defined above with those esters of (triphenyl phosphoranylidene)-acetic acid the alcohol component of which corresponds to the definition of $R_6$, e.g. with the known (triphenyl phosphoranylidene)-acetic acid methyl or ethyl ester. The reaction is performed in an inert organic solvent such as benzene, abs. ether or tetrahydrofuran, at room temperature up to boiling temperature of the solvents mentioned. Esters of general Formula III are also obtained by condensing aldehydes of general Formula II with acetic acid esters having an alcohol component corresponding to the definition of $R_6$, such as methyl acetate or ethyl acetate. This Claisen condensation is performed with the aid of an alkali metal and also a slight addition of the alkali metal alcoholate corresponding to the alcohol component $R_6$, in an excess of the tester to be reacted. The temperature for the condensation is about 0° to room temperature.

Nitriles of the general Formula III are obtained, e.g. analogously to the first process for the production of acids of the general Formula I by condensing, under the conditions there given, e.g. according to Knoevenagel, cyanoacetic acid instead of malonic acid with aldehydes of general Formula II and decarboxylating, by heating, the substituted benzylidene cyanoacetic acids so obtained.

As stated above the invention also concerns the conversion of the substituted cinnamic acids of the invention into salts with inorganic or organic bases, which is effected according to the usual methods well known in the art.

Salts suitable for therapeutic and cosmetic use are those with pharmacologically acceptable inorganic and organic bases, i.e. with bases which, in the usual dosages, have no physiological action of their own or, however, have a desired action, e.g. in forms for parenteral administration particularly a local anaesthetic action. Suitable salts are, e.g. sodium, potassium, lithium, magnesium, calcium and ammonium salts as well as salts with ethylamine, triethylamine, ethanolamine, diethanolamine, diethylaminoethanol, ethylenediamine, benzylamine, procain, pyrrolidine, piperidine, morpholine, 1-ethyl piperidine or 2-piperidino-ethanol.

It has now been found that the inventive acids and their salts with inorganic or organic bases have valuable pharmacological properties, in particular antiphlogistic (anti-inflammatory), analgesic and antipyretic activity with, at the same time, a favourable therapeutic index. They can be administered orally, rectally or, in the form of aqueous solutions of soluble salts, also parenterally, in particular intramuscularly, for the treatment of rheumatic, arthritic and other inflammatory diseases.

Particularly advantageous compounds according to the invention are substituted cinnamic acids of the formula

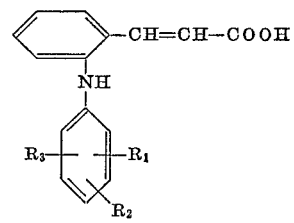

wherein $R_1$ represents hydrogen, methyl, chlorine or trifluoromethyl, $R_2$ represents hydrogen, methyl or trifluoromethyl, and $R_3$ represents hydrogen, methyl or chlorine, as well as the addition salts thereof with inorganic or organic bases.

The antiphlogistic activity of the inventive acids and their salts can be studied in pharmacological tests, e.g., in the UV erythema test according to G. Wilhelmi, Schweizerische Medizinische Wochenschrift 79, 577 (1949), in the guinea pig, or in the Bolus alba edema test according to G. Wilhelmi, Jap. J. Pharmacol. 15, 187 (1965), in the rat.

It is found that e.g. o-($\alpha,\alpha,\alpha$-trifluoro-m-toluidino)-cinnamic acid, and e.g. o-(2,6-dichloro-m-toluidino)-cinnamic acid when administered in the first test to guinea pigs show already at dosages of about 37 and 1.7 mg./kg. p.o., respectively, distinct antiphlogistic action. A similar effect is shown by o-($\alpha,\alpha,\alpha$-trifluoro-m-toluidino)-cinnamic acid and also e.g. by o-(2,6-dichloroanilino)-cinnamic acid in the second test on administration of about 400 mg./kg. p.o. to rats.

In the writhing test according to E. Siegmund, R. Cadmus and G. Lu, Proc. Soc. exp. Biol. Med. 95, 729 (1957), distinct analgesic activity is demonstrated by e.g. o-(2,6-dichloroanilino)-cinnamic acid when administered in dosages of about 80 mg./kg. p.o. to mice.

For their therapeutic use, the treatment of rheumatic, arthritic and other inflammatory diseases, the new substituted cinnamic acids of the invention and their pharmaceutically acceptable addition salts with inorganic or organic bases are, as mentioned above, administered orally, rectally or parenterally, particularly intramuscularly, in amounts depending on the species, age and weight of the subject under treatment as well as on the particular condition to be treated and, of course, the mode of administration; generally, the daily internal doses of the substituted cinnamic acids of the invention and their pharmaceutically acceptable addition salts with inorganic or organic bases vary between 10 and 1000 mg.

For administration purposes, preferably, the above mentioned therapeutic compositions are used. These compositions are presented for oral, rectal or parenteral, particularly intramuscular, administration in dosage units such as tablets, dragées (sugar coated tablets), capsules, suppositories or ampoules, preferably containing 5–300 mg. of a free acid according to the invention, or a pharmaceutically acceptable addition salt thereof with an inorganic or organic base. Incorporated into ointment or sun tan bases these compounds can also be applied externally.

Dosage units for oral administration preferably contain between 1% and 90% of an acid of general Formula I or of a pharmacologically acceptable salt thereof as active substance. They are produced by combining the active substances, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance. Other suitable oral dosage units are hard gelatine capsules made of gelatine as well as soft closed capsules made of gelatine and a softener such as glycerine. The former preferably contain the active substance as a granulate in admixture with lubricants such as talcum or magnesium stearate and, optionally, stabilising agents such as sodium metabisulphite ($Na_2S_2O_5$) or ascorbic acid. In soft capsules, the active substance is preferably dissolved or suspended in suitable liquids such as liquid polyethylene glycols to which stabilising agents can also be added.

The following prescriptions further illustrate the production of tablets and dragées:

(a) 1000.0 g. of active substance, e.g. o-(2,6-dichloroanilino)-cinnamic acid or its calcium or lithium salt are mixed with 550.0 g. of lactose and 292.0 g. of potato starch, the mixture is moistened with an alcoholic solution of 8.0 g. of gelatine and granulated through a sieve. After drying, 60.0 g. of potato starch, 60.0 g. of talcum, 10.0 g. of magnesium stearate and 20.0 g. of colloidal silicon dioxide are mixed in and the mixture is pressed into 10,000 tablets each weighing 200 mg. and containing 100 mg. of active substance. If desired, the tablets can be grooved for better adaptation of the dosage.

(b) 200.0 g. of active substance, e.g. o-(2,6-dichloro-m-toluidino)-cinnamic acid, are well mixed with 16 g. of maize starch and 6.0 g. of colloidal silicon dioxide. The mixture is moistened with a solution of 2.0 g. of stearic acid, 6.0 g. of ethyl cellulose and 6.0 g. of stearin in about 70 ml. of isopropyl alcohol and granulated through a sieve III (Ph. Helv. V). The granulate is dried for about 14 hours and then passed through sieve III-IIIa. It is then mixed with 16.0 g. of maize starch, 16.0 g. of talcum and 2.0 g. of magnesium stearate and pressed into 1000 dragée cores. These are coated with a concentrated syrup made from 2.000 g. of shellac, 7.500 g. of gum arabic, 0.150 g. of dyestuff, 2.000 g. of highly dispersed silicon dioxide, 25.000 g. of talcum and 53.350 g. of sugar and dried. The dragées obtained each weigh 360 mg. and contain 200 mg. of active substance.

Examples of dosage units for rectal administration are suppositories which consist of a combination of an acid of general Formula I or a suitable salt thereof with a suppository foundation mass based on natural or synthetic triglycerides, e.g. cocoa butter, and polyethylene glycols of suitable molecular weight or suitable higher fatty alcohols, and also gelatine rectal capsules which contain a combination of an active substance or a suitable salt thereof with polyethylene glycols of suitable molecular weight.

Ampoules for parenteral, particularly intramuscular administration, preferably contain a water soluble salt, e.g. the sodium salt, of a substituted phenyl acetic acid of general Formula I in a concentration of, preferably, 0.5–5%, in aqueous solution, optionally together with suitable stabilising agents and buffer substances.

In addition to their pharmacological properties the inventive cinnamic acids as well as their addition salts with inorganic or organic bases are capable of absorbing the ultraviolet rays of a wavelength range of 290 to 300 millimicrons which are primarily responsible for sunburn, while at the same time they do not absorb the desirable so-called "tanning" rays of over 315 millimicrons wavelength. These compounds are, therefore, especially useful as ultraviolet absorbers for cosmetic purposes, e.g. in sun tan creams or lotions.

Sun tan compositions according to the invention contain a sufficient amount of at least one compound of Formula I or a pharmaceutically acceptable salt thereof with a base, in an amount which absorbs a sufficient amount of ultraviolet radiation having a wavelength in the range of from about 290 to 300 millimicrons, as well as a carrier compatible with said compound or salt thereof, which carrier is of creamy to highly fluid consistency.

One of the following prescriptions can be used for the production of sun tan creams:

(A)

| | G. |
|---|---|
| o-(2,6-dichloroanilino)-cinnamic acid | 1.0 |
| Paraffin oil, thinly liquid | 1.0 |
| Polyoxyethylene sorbitan monostearate | 2.0 |
| Polyoxyethylene sorbitol lanoline derivative | 1.5 |
| Sorbitol solution 70% | 3.0 |
| Stearic acid | 15.0 |
| Preservative+perfume, q.s. | |
| Water ad 100.0 g. | |

(B)

| | G. |
|---|---|
| o-($\alpha,\alpha,\alpha$-Trifluoro-m-toluidino)-cinnamic acid | 1.0 |
| Propylene glycol | 28.0 |
| Glycerine monostearate | 18.0 |
| Polyoxyethylene-sorbitan monolaurate | 8.0 |
| Thimerosal (solution 1:1000) | 1.0 |
| Perfume, q.s. | |
| Water ad 100.0 g. | |

The following non-limitative examples further illustrate the invention. Temperatures are given in centigrade, percentages are given by weight. Torr means mm. Hg.

Example 1.—o-($\alpha,\alpha,\alpha$-trifluoro-6-chloro-m-toluidino)-cinnamic acid A solution of 47.1 g. of N-($\alpha,\alpha,\alpha$-trifluoro-6-chloro-m-tolyl)-anthranil aldehyde, 35.4 g. of malonic acid and 2.3 ml. of piperidine in 70 ml. of pyridine are heated, while stirring for 3 hours at 100° and then for 1 hour at 130°. The cooled solution is poured onto ice and the precipitated oil is extracted with 300 ml. of ethyl acetate. The ethyl acetate solution is then extracted with 0.5 N sodium carbonate solution and water. The aqueous-alkaline extracts are then combined and acidified by the addition of 2 N hydrochloric acid at 5°. The crystals which precipitate are filtered off, washed with water and recrystallised from ethanol. The o-($\alpha,\alpha,\alpha$-trifluoro-6-chloro-m-toluidino)-cinnamic acid so obtained melts at 198–200°.

The following compounds, e.g. are produced analogously:

o - (2,6 - dichloroanilino) - cinnamic acid, M.P. 222–224°; and o - (2,6 - dichloro - m - toluidino) - cinnamic acid, M.P. 217–219°, by using instead of 47.1 g. of N-($\alpha,\alpha,\alpha$-trifluoro-6-chloro-m-tolyl)-anthranil aldehyde equivalent amounts of N-(2,6-dichloro-phenyl)-anthranil aldehyde and
N-(2,6-dichloro-m-tolyl)-anthranil aldehyde, respectively.

The N-substituted anthranil aldehydes necessary as starting materials can be produced, e.g. as follows:

(a) N - ($\alpha,\alpha,\alpha$ - trifluoro - 6 - chloro - m - tolyl) - anthranilic acid chloride.—A solution of 10 g. of N-($\alpha,\alpha,\alpha$-trifluoro-6-chloro-m-tolyl)-anthranilic acid in 55 ml. of thionyl chloride is left to stand overnight, a strong stream of dry nitrogen being bubbled through the solution. It is then evaporated to dryness at 40° under 11 torr, the residue is dissolved in 40 ml. of anhydrous benzene and this solution is again evaporated to dryness at 40° under 11 torr. The residue, a red oil, is crystallised from petroleum ether, whereupon N-($\alpha,\alpha,\alpha$-trifluoro-6-chloro-m-tolyl)-anthranilic acid chloride is obtained, M.P. 67–69°.

The following compounds, e.g. are produced analogously:

N-(2,6-dichlorophenyl)-anthranilic acid chloride, M.P. 100–101°; and

N-(2,6-dichloro-m-tolyl)-anthranilic acid chloride, M.P. 120–122°, by using instead of 10 g. of N-($\alpha,\alpha,\alpha$-trifluoro-6-chloro-m-tolyl)-anthranilic acid equivalent amounts of N-(2,6-dichlorophenyl)-anthranilic acid and
N-(2,6-dichloro-m-tolyl)-anthranilic acid, respectively.

(b) N-($\alpha,\alpha,\alpha$-trifluoro-6-chloro-m-tolyl)-anthranil aldehyde.—A solution of 134 g. of N-($\alpha,\alpha,\alpha$-trifluoro-6-chloro-m-tolyl)-anthranilic acid chloride in 1000 ml. of anhydrous diethylene glycol dimethyl ether is cooled to −75° under an atmosphere of nitrogen. While cooling with a Dry Ice/acetone bath, 114 g. of lithium-tri-tert. butoxy aluminium hydride are added in portions. The mixture is then stirred for 45 minutes at −70°, the cooling bath is removed and stirring is continued for 2 hours. The reaction mixture is poured onto ice while stirring and after 1 hour the precipitated yellow crystals are filtered off. The crystals are suspended in a mixture of ethyl acetate and 2 N hydrochloric acid. The suspension is shaken until two clear phases are formed which are then separated. The organic phase is extracted with water, 2 N sodium bicarbonate solution and again with water. It is then dried over sodium sulphate and evaporated at 50° under 11 torr. The residue is distilled under high vacuum. The N-($\alpha,\alpha,\alpha$-trifluoro-6-chloro-m-tolyl)-anthranil aldehyde boils at 125°/0.001 torr; it is a yellow oil.

The following compounds, e.g., are produced analogously:

N-(2,6-dichlorophenyl) - anthranil aldehyde, M.P. 109–111°; and

N-(2,6-dichloro-m-tolyl) - anthranil aldehyde, M.P. 90–92°, by using instead of 134 g. of N-($\alpha,\alpha,\alpha$-trifluoro-6-chloro-m-tolyl)-anthranilic acid chloride equivalent amounts of N-(2,6-dichlorophenyl)-anthranilic acid chloride and
N-(2,6-dichloro-m-tolyl)-anthranilic acid chloride, respectively.

Example 2.—o-(2,3-xylidino)-cinnamic acid (trans)

1.0 g. of N-(2,3-xylyl)-anthranil aldehyde are dissolved in 9 ml. of pyridine and 0.3 ml. of piperidine and, at 90°, 4.6 g. of malonic acid are added in portions within 1½ hours. The mixture is heated for 30 minutes at 130°, then poured onto 100 ml. of 2 N hydrochloric acid and extracted with ethyl acetate. The organic phase is extracted with 2 portions of 2 N sodium hydroxide solution. After acidifying the alkaline solution with 2 N hydrochloric acid, yellow crystals precipitate which are recrystallised from ether/petroleum ether. The o-(2,3-xylidino)-cinnamic acid obtained melts at 191–192°.

The aldehyde serving as starting material is produced, e.g. as follows:

(a) N-(2,3-xylyl)-anthranilic acid methyl ester.—393 g. of N-(2,3-xylyl)-anthranilic acid are dissolved in a solution of 76.7 g. of sodium hydroxide (85%) in 820 ml. of water and, at 30–40°, 206 g. of dimethyl sulphate are added. The reaction mixture is stirred for 14 hours at 20–30°. The precipitated reaction product is then filtered off under suction and recrystallised from ethyl acetate. The N-(2,3-xylyl)-anthranilic acid methyl ester so obtained melts at 98–99°.

(b) N-(2,3-xylyl)-anthranilic acid hydrazide.—220 g. of N-(2,3-xylyl)-anthranilic acid methyl ester and 67 g. of hydrazine hydrate (85%) are refluxed for 10 hours under an atmosphere of nitrogen. After cooling, 300 ml. of ethyl acetate are added to the reaction mixture and the whole is washed three times with 90 ml. of water each time. The organic phase is concentrated and recrystallised from 95% ethanol. The N-(2,3-xylyl)-anthranilic acid hydrazide melts at 117–118°.

(c) N-(2,3-xylyl)-anthranilic acid -N"-(p-tolylsulphonyl)-hydrazide.—55.2 g. of hydrazide are dissolved in 100 ml. of pyridine and, in an ice bath, 41.6 g. p-toluene sulphonyl chloride are added. The mixture is left to stand overnight at 20–25° and then poured into a mixture of 50 g. of ice and 200 ml. of 2 N hydrochloric acid. On extracting with ethyl acetate and concentrating the solution, N - (2,3 - xylyl) - anthranilic acid-N"-(p-tolylsulphonyl)-hydrazide is obtained in the form of yellow crystals which are recrystallised from 95% ethanol. M.P. 165–166°.

(d) N - (2,3-xylyl)-anthranil aldehyde.—27.9 g. of anhydrous sodium carbonate are added to 46.0 g. of the product of (c) in 214 ml. of ethylene glycol, the addition being made at 160°, and the mixture is poured onto 300 g. of ice. On extracting with ethyl acetate and concentrating the extract, 21.9 g. are obtained as a brown oil which is chromatographed on 30 times the amount of Silicagel. A mixture of benzene/ethyl acetate/glacial acetic acid (94:5:1) is used as eluent. The first 5 fractions of 50 ml. are recrystallised from methanol. The N-(2,3-xylyl)-anthranil aldehyde obtained melts at 49–50°.

Example 3.—o - ($\alpha,\alpha,\alpha$ - trifluoro-6-chloro-m-toluidino)-cinnamic acid 300 ml. of 2 N potassium hydroxide are added to a solution of 85 g. of o-($\alpha,\alpha,\alpha$-trifluoro-6-chloro-m-toluidino)-cinnamic acid ethyl ester in 500 ml. of ethanol. The clear solution is refluxed for 6 hours, cooled and evaporated at 50° under 11 torr. The residue is dissolved in 400 ml. of water. The aqueous solution is extracted with ether and then acidified with 2 N hydrochloric acid. The precipitated o - ($\alpha,\alpha,\alpha$ - trifluoro-6-chloro-m-toluidino)-cinnamic acid is filtered off and recrystallised from ethanol. The yellow crystals melt at 199–200°.

The following compounds, for example, are produced analogously:

o-(α,α,α-Trifluoro-m-toluidino)-cinnamic acid, M.P. 163–165°;
o-(2,6-dichloroanilino)-cinnamic acid, M.P. 222–224°;
o-(2,6-dichloro-m-toluidino)-cinnamic acid, M.P. 217–219°;
o-(2,3-xylidino)-cinnamic acid, M.P. 191;
o-(2,6-xylidino)-cinnamic acid, M.P. 171–172;
2-(2,6-dichloroanilino)-5-methoxy-cinnamic acid, M.P. 197–198°;
2-(2,6-dichloroanilino) - 4 - chlorocinnamic acid, M.P. 228–229°; and
2-(2,6-xylidino)-4-chlorocinnamic acid, M.P. 234–235°, by using instead of 85 g. of o-(α,α,α-trifluoro-6-chloro-m-toluidino)-cinnamic acid ethyl ester equivalent amounts of cinnamic acid ethyl esters correspondingly substituted to the above listed acids.

The ethyl esters required as starting materials are produced as follows: o-(α,α,α-trifluoro-6-chloro-m-toluidino)-cinnamic acid ethyl ester.

A solution of 100 g. of N-(α,α,α-trifluoro-6-chloro-m-tolyl)-anthranil aldehyde (M.P. 49–50°) and 116 g. of (triphenyl-phosphoranylidene)-acetic acid ethyl ester in 500 ml. of anhydrous benzene is refluxed for 16 hours while excluding moisture. The solution is then cooled and evaporated to dryness at 40° under 11 torr. 400 ml. of ether are added and after stirring for a short time, it is filtered. The filtrate is evaporated to dryness at 40° under 11 torr. The residue, an oil, is chromatographed on 600 g. of neutral aluminium oxide. The fractions 2–4 eluted with ether/petroleum ether (1:1) are combined and crystallised from ether/petroleum ether. The o-(α,α,α-trifluoro-6-chloro-m-toluidino)-cinnamic acid ethyl ester melts at 107–108°.

The following compounds, for example are produced analogously:

o-(α,α,α-Trifluoro-m-toluidino)-cinnamic acid ethyl ester, M.P. 78–79°;
o-(2,6-dichloroanilino)-cinnamic acid ethyl ester, M.P. 107–109°;
o-(2,6-dichloro-m-toluidino)-cinnamic acid ethyl ester, M.P. 95–96°;
o-(2,3-xylidino)-cinnamic acid ethyl ester (oil);
o-(2,6-xylidino)-cinnamic acid ethyl ester, M.P. 101–102°;
2-(2,6-dichloroanilino)-5-methoxy - cinnamic acid ethyl ester, M.P. 110–112°, and
2-(2,6-dichloroanilino)-4 - chloro - cinnamic acid ethyl ester, M.P. 98–100°, by using instead of 100 g. N-(α,α,α-trifluoro-6-chloro-m-tolyl)-anthranil aldehyde equivalent amounts of anthranil aldehydes correspondingly substituted to the above listed cinnamic acid ethyl esters. The starting aldehydes are obtained from the correspondingly substituted anthranilic acid chlorides which in turn are obtained from the correspondingly substituted anthranilic acids, analogously to Example 1 (a) and (b).

What is claimed is:
1. A compound of the formula

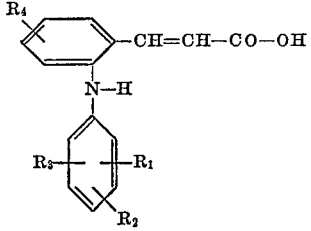

wherein
each of $R_1$ and $R_2$ represents hydrogen, lower alkyl or alkoxy, halogen up to the atomic number 35 or trifluoromethyl, $R_3$ represents hydrogen, lower alkyl or alkoxy, or halogen up to the atomic number 35, and
$R_4$ represents hydrogen or lower alkyl or alkoxy, halogen up to the atomic number 35, or trifluoromethyl.

2. A pharmaceutically acceptable addition salt of a compound as defined in claim 1 with an alkali metal, an alkaline earth metal, ammonia, ethylamine, triethylamine, ethanolamine, diethanolamine, diethylaminoethanol, ethylenediamine, benzylamine, procaine, pyrrolidine, piperidine, morpholine, 1-ethylpiperidine or 2-piperidinoethanol.

3. A compound of the formula:

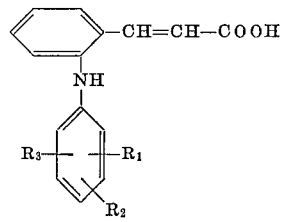

wherein $R_1$ represents hydrogen, methyl, chlorine or trifluoromethyl,
$R_2$ represents hydrogen, methyl or trifluoromethyl, and
$R_3$ represents hydrogen, methyl or chlorine, or a pharmaceutically acceptable addition salt thereof with an alkaline earth metal, ammonia, ethylamine, triethylamine, ethanolamine, diethanolamine, diethylaminoethanol, ethylenediamine, benzylamine, procaine, pyrrolidine, piperidine, morpholine, 1-ethylpiperidine or 2-piperidinoethanol.

4. A compound as defined in claim 3 which is o-(2,6-dichloroanilino)-cinnamic acid or a pharmaceutically acid addition salt thereof with an alkali metal, an alkaline earth metal, ammonia, ethylamine, triethylamine, ethanolamine, diethanolamine, diethylaminoethanol, ethylenediamine, benzylamine, procaine, pyrrolidine, piperidine, morpholine, 1-ethylpiperidine or 2-piperidinoethanol.

5. A compound as defined in claim 3 which is o-(2,6-dichloro-m-toluidino)-cinnamic acid or a pharmaceutically acceptable acid addition salt thereof with an alkali metal, an alkaline earth metal, ammonia, ethylamine, triethylamine, ethanolamine, diethanolamine, diethylaminoethanol, ethylenediamine, benzylamine, procaine, pyrrolidine, piperidine, morpholine, 1-ethylpiperidine, or 2-piperidinoethanol.

6. A compound as defined in claim 3 which is o-(α,α,α-trifluoro-m-toluidino)-cinnamic acid or a pharmaceutically acceptable acid addition salt thereof with an alkali metal, an alkaline earth metal, ammonia, ethylamine, triethylamine, ethanolamine, diethanolamine, diethylaminoethanol, ethylenediamine, benzylamine, procaine, pyrrolidine, piperidine, morpholine, 1-ethylpiperidine, or 2-piperidinoethanol.

References Cited
UNITED STATES PATENTS 2,849,447   8/1958   Kartinos et al. _____ 260—239.7

OTHER REFERENCES

Beilsteins Handbuch der Organischen Chemie, 4th ed., vol. 14, pp. 517–519 (system No. 1906), Verlag von Springer, Berlin, Germany (1931).

Chemical Abstracts, vol. 45, cols. 9742 to 9743 (1951) (abstracts of Bersch et al.).

JOHN D. RANDOLPH, Primary Examiner

U.S. Cl. X.R.

260—465, 471, 518, 519; 424—248, 267, 274